United States Patent [19]
Szlaga et al.

[11] Patent Number: 5,755,248
[45] Date of Patent: May 26, 1998

[54] FUEL TANK VENTING CONTROL VALVE ASSEMBLY

[75] Inventors: Emil Szlaga, Connersville, Ind.; Robert H. Thompson, Dearborn Heights, Mich.

[73] Assignee: Stant Manufacturing, Inc., Connersville, Ind.

[21] Appl. No.: 855,314

[22] Filed: Mar. 23, 1992

Related U.S. Application Data

[60] Division of Ser. No. 533,464, Jun. 5, 1990, Pat. No. 5,099,880, which is a continuation-in-part of Ser. No. 328,451, Mar. 24, 1989, Pat. No. 4,953,583.

[51] Int. Cl.$^6$ ........................................... F16K 17/36
[52] U.S. Cl. .................. 137/43; 123/514; 220/29; 220/86.2; 220/746; 137/587; 251/29
[58] Field of Search .................... 137/118, 587, 137/588, 43; 123/518, 519; 251/29; 220/86.2, 746

[56] References Cited

U.S. PATENT DOCUMENTS

| | | |
|---|---|---|
| 2,133,200 | 10/1938 | Kenneweg . |
| 2,399,326 | 4/1946 | Crot . |
| 2,860,656 | 11/1958 | Eshbaugh . |
| 3,062,246 | 11/1962 | Koehler . |
| 3,363,641 | 1/1968 | Mylander . |
| 3,606,908 | 9/1971 | Riester . |
| 3,616,783 | 11/1971 | La Masters . |
| 3,744,516 | 7/1973 | Rowe . |
| 3,771,690 | 11/1973 | Hunter . |
| 3,907,153 | 9/1975 | Mutty . |
| 3,981,478 | 9/1976 | Lundsgart . |
| 4,036,255 | 7/1977 | Wilson . |
| 4,191,208 | 3/1980 | Mylander . |
| 4,292,996 | 10/1981 | Pataki et al. . |
| 4,312,649 | 1/1982 | Fujii et al. . |
| 4,405,000 | 9/1983 | Fuller . |
| 4,416,108 | 11/1983 | Ghandhi . |
| 4,444,222 | 4/1984 | Yamagiwa . |
| 4,706,708 | 11/1987 | Fornuto et al. . |
| 4,714,171 | 12/1987 | Sasaki et al. . |
| 4,715,509 | 12/1987 | Ito et al. . |
| 4,760,858 | 8/1988 | Szlaga . |
| 4,790,349 | 12/1988 | Harris . |
| 4,796,593 | 1/1989 | Woodcock et al. . |
| 4,813,453 | 3/1989 | Jenkins et al. . |
| 4,926,914 | 5/1990 | Morizumi et al. . |
| 4,932,444 | 6/1990 | Micek . |
| 5,054,508 | 10/1991 | Benjey . |

FOREIGN PATENT DOCUMENTS 27 43 490  4/1979  Germany .

*Primary Examiner*—Stephen M. Hepperle
*Attorney, Agent, or Firm*—Barnes & Thornburg

[57] ABSTRACT

A tank pressure control valve is provided for controlling the discharge of fuel vapor from a fuel tank. In one embodiment, the tank pressure control valve is configured to use pressurized fuel vapor to control a flexible diaphragm operable between a closed position blocking discharge of fuel vapor from the fuel tank and an opened position allowing such discharge. In another embodiment, the tank pressure control valve is configured to use pressurized fuel vapor to move a flexible diaphragm to move a rigid valve member between a closed position and an opened position.

25 Claims, 2 Drawing Sheets

FUEL TANK VENTING CONTROL VALVE ASSEMBLY

This is a division of application Ser. No. 07/533,464 filed Jun. 5, 1990, now U.S. Pat. No. 5,094,880 which is a continuation-in-part of application Ser. No. 07/328,451 filed Mar. 24, 1989 (now U.S. Pat. No. 4,953,583 issued Sep. 4, 1990).

BACKGROUND AND SUMMARY OF THE INVENTION

The present invention relates to fuel tank pressure control valves for selectively discharging pressurized fuel vapor from a fuel tank. More particularly, the invention relates to fuel tank pressure control valves designed to maintain a predetermined vapor pressure in the fuel tank during refueling to prevent a pump nozzle operator from overfilling the fuel tank and to vent pressurized fuel vapor from the fuel tank, when necessary, after the tank has been refueled.

Although fuel pump nozzles are known to include sensor means for shutting off the flow of fuel from the nozzle when the fuel tank is nearly filled, it has been observed that users frequently manually override or bypass such fill-limiting sensors by continuing to pump fuel after the pump nozzle has automatically shut off several times. It will be appreciated that such unauthorized refueling practices can result in overfilling the fuel tank which can effectively reduce the fuel vapor expansion capacity available within the filled fuel tank.

An improved fuel vapor control valve is provided for maintaining a head pressure within the fuel tank which exceeds the maximum head pressure that can develop in the filler neck due to filling the filler neck with fuel. The improved valve advantageously aids in preventing fuel pump operators from overfilling fuel tanks by providing a pressurized fuel vapor barrier within the fuel tank that acts to block the introduction of fuel into the fuel tank in excess of a predetermined fuel capacity during refueling. At the same time, the improved valve is adapted automatically to open and release pressurized fuel vapor after refueling to increase the flow of fuel vapor to a fuel vapor treatment site and/or the atmosphere, thereby enhancing engine performance, and avoiding shortcomings of known fuel tank valves.

One object of the present invention is to provide a tank pressure control valve that closes automatically during refueling to retain fuel vapor in the fuel tank to develop a pressure head in the tank and prevent overfilling of the tank and yet also opens automatically to vent fuel vapor from the fuel tank at all other times should the pressure of the fuel vapor in the fuel tank rise above a predetermined level.

Another object of the present invention is to provide a tank pressure control valve of small size having a high discharge capacity to vent the fuel tank properly while the vehicle is stationary or operating.

Yet another object of the present invention is to vent high pressure fuel vapor from the fuel tank using one or more differential pressure valve assemblies that move between opened and closed positions in response to changing vapor pressures in the fuel tank or filler neck.

Another object of the present invention is to provide a tank pressure control valve assembly configured to use fuel vapor pressure to control a flexible diaphragm operable between a closed position blocking discharge of fuel vapor from the fuel tank and opened positions allowing such discharge.

Still another object of the present invention is to provide a tank pressure control valve assembly configured to use fuel vapor pressure to control a flexible diaphragm positioned to actuate a separate vent valve operable between a closed position blocking discharge of fuel vapor from the fuel tank and opened positions allowing such discharge.

According to the present invention, an apparatus is provided for controlling discharge of fuel vapor from a fuel tank having a filler neck. The apparatus includes means for conducting fuel vapor between the fuel tank and a fuel vapor treatment site and means for selectively blocking flow of fuel vapor through the conducting means. The blocking means is operable between a flow blocking position blocking flow of fuel vapor through the conducting means and flow delivery positions allowing fuel vapor to flow through the conducting means. In addition, the apparatus includes means for delivering fuel vapor to the blocking means to apply a closing pressure to the blocking means and means for using pressurized fuel vapor in the filler neck to selectively block flow of fuel vapor through the delivery means. Thus, the using means controls delivery of pressurized fuel vapor to the blocking means to control the movement of the blocking means between the flow-blocking position and flow-delivery positions.

In preferred embodiments, the blocking means comprises a diaphragm assembly. Thus, fuel vapor from the fuel tank delivered through the delivery means acts against the diaphragm assembly to control discharge of fuel vapor through the conducting means.

In alternative embodiments of the present invention, an apparatus is provided for controlling discharge of fuel vapors from a fuel tank having a filler neck. The apparatus comprises means for conducting fuel vapor between the fuel tank and a fuel vapor treatment site, means for selectively blocking flow of fuel vapor through the conducting means, and means for actuating the blocking means in response to development of fuel vapor pressure in the filler neck. The blocking means is disposed in the conducting means and is operable between a flow-blocking position blocking flow of fuel vapor through the conducting means and flow-delivery positions allowing fuel vapor to flow through the conducting means. The actuating means operates to move the blocking means away from its flow-blocking position toward a flow delivery position when the pressure of fuel vapor in the filler neck exceeds a predetermined level. Thus, when the pressure of fuel vapor in the filler neck rises beyond the predetermined level, the actuation means moves the blocking means to allow fuel vapor to vent from the fuel tank through the conducting means to a fuel vapor treatment site.

In preferred embodiments the actuating means includes a diaphragm assembly deformable under the pressure of fuel vapor in the filler neck to bear against the blocking means to move it to a flow-delivery position. The blocking means can include, for example, a rigid valve member.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
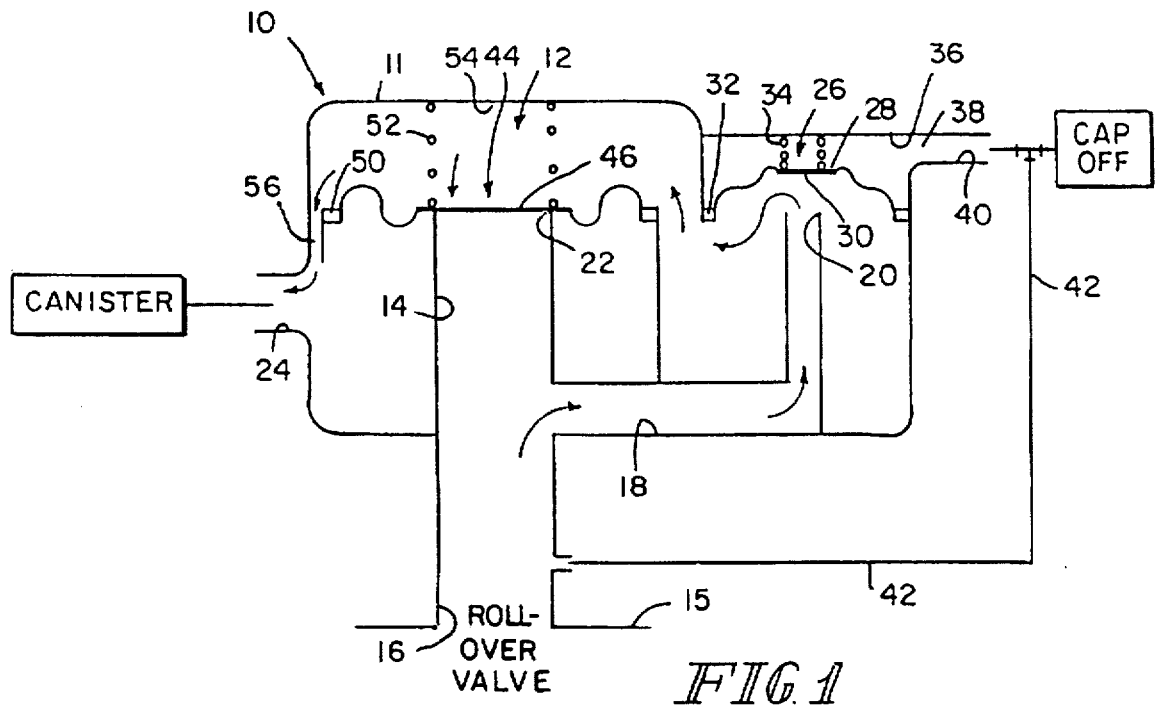
FIG. 1 is a schematic of an embodiment of a valve assembly in accordance with the present invention showing the valve assembly during refueling.
Figure 2:
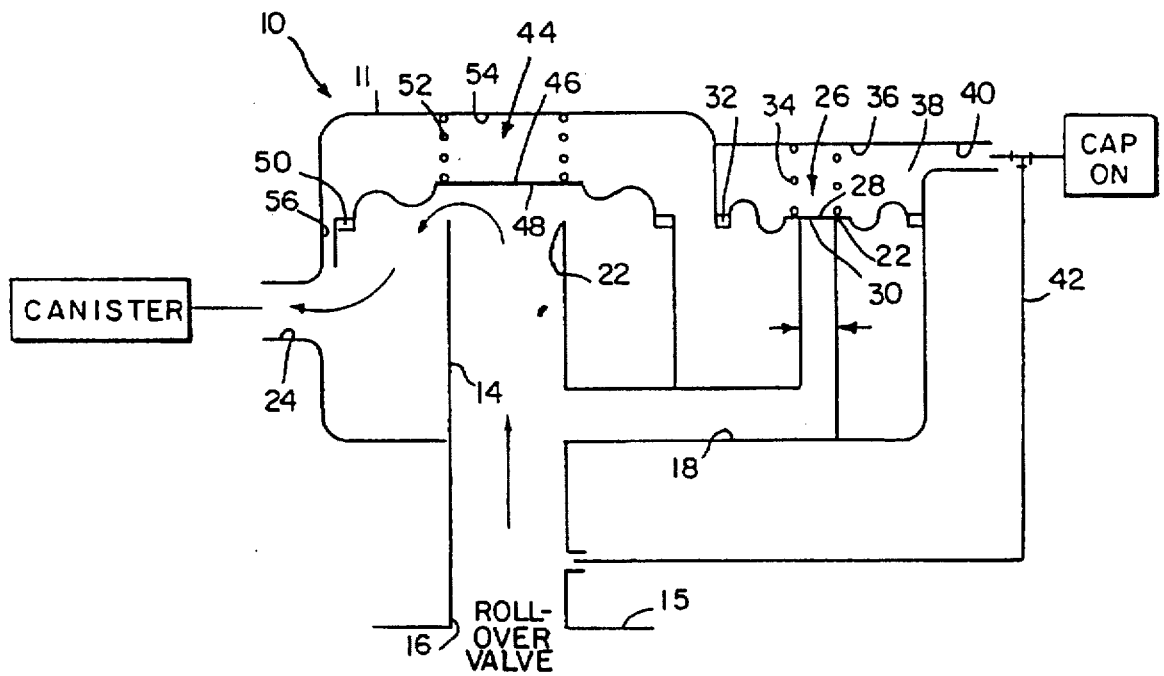
FIG. 2 is a schematic of the valve of FIG. 1 showing the valve assembly after the cap is reattached to the filler neck following refueling.

A schematic illustration of one embodiment of a fuel vapor control valve 10 in accordance with the present invention is provided in FIGS. 1-2. Valve 10 is shown in FIGS. 1-2 to include a valve housing 11 connected to a fuel tank 15 and defining an interior region 12. Valve housing 11 can be mounted directly in a fuel tank 15 or can be connected in fluid communication with the fuel tank 15 by way of a conduit. Optionally, a rollover valve assembly (not shown) can be interposed in the conduit between the fuel tank and valve housing 11.

A tube providing a fuel vapor conducting passageway 14 extends into the interior region 12 to conduct fuel vapor between the fuel tank and the interior region 12. Conducting passageway 14 includes an inlet aperture 16 in communication with the fuel tank 15. Conducting passageway 14 also includes a branch passageway 18 terminating in a first outlet aperture 20. Branch passageway 18 serves as means for delivering an amount of fuel vapor to the interior region 12 through first outlet aperture 20.

Conducting passageway 14 also includes a second outlet aperture 22. Fuel vapor flowing through conducting passageway 14 and then through second outlet aperture 22 during vehicle operation passes to an exit passageway 24 as shown in FIG. 2. Advantageously, exit passageway 24 is connected to a fuel vapor treatment apparatus, which may comprise, for example, a charcoal canister.

A flexible, annular diaphragm 26 having a first side 28 and a second side 30 and being operable between a flow-blocking position and flow-delivery positions is mounted to housing 11 in interior region 12 by conventional mounting means 32. Diaphragm 26 is positioned to sealingly engage a valve seat bordering first outlet aperture 20 to selectively block flow of fuel vapor through outlet aperture 20 of branch passageway 18. A spring 34 or other suitable biasing means is provided to bias diaphragm 26 toward its flow-blocking position blocking flow of fuel vapor through outlet aperture 20 of branch passageway 18. Spring 34 seats against an interior wall 36 of housing 11 and acts between the interior wall 36 and the diaphragm 26.

Advantageously, diaphragm 26 cooperates with interior wall 36 to define a vapor flow channel 38. Vapor flow channel 38 lies in fluid communication with an inlet passageway 40 which in turn is positioned to receive fuel vapor from filler neck 42 of the fuel tank. Filler neck 42 is shown schematically in FIGS. 1-2 to be connected in fluid communication with the fuel tank 15. Thus, fuel vapor from the fuel tank 15 flows to filler neck 42 and passes to the inlet passageway 40, subsequently flowing to the vapor flow channel 38 to supply a pressure to second side 30 of diaphragm 26.

When diaphragm 26 is moved to a flow-delivery position (shown in FIG. 1), fuel vapor can flow through aperture 20 of branch passageway 18 into interior region 12. Advantageously, fuel vapor in interior region 12 is directed to act against a second flexible, annular diaphragm 44. Diaphragm 44 includes a first side 46 and a second side 48 and is mounted to housing 11 in interior region 12 by conventional mounting means 50. Diaphragm 44 is operable between a flow-blocking position and flow-delivery positions. Diaphragm 44 is positioned to sealingly engage a valve seat bordering outlet aperture 22 of conducting passageway 14 to selectively block flow of fuel vapor therethrough. A spring 52 seated against an interior wall 54 of housing 11 acts to bias the diaphragm 44 toward its flow-blocking position in cooperation with the pressurized fuel vapor in interior region 12.

A bleed passageway 56 interconnects interior region 12 and exit passageway 24 in fluid communication. Advantageously, when second diaphragm 44 is moved from its flow-blocking position towards a flow-delivery position during development of high fuel vapor pressure in the fuel tank, pressurized fuel vapor entrapped in the interior region 12 is forced through bleed passageway 56, thus gradually dissipating the pressure in interior region 12. Importantly, bleed passageway 56 is small enough so as not to affect the buildup of pressurized fuel vapor into the interior region 12 to move the diaphragm 44 to its flow-blocking position as is desired during refueling of the fuel tank. When diaphragm 44 is moved to its flow-delivery position (shown in FIG. 2), fuel vapor can flow through outlet aperture 22 of conducting passageway 14 into exit passageway 24, eventually passing to a fuel vapor treatment site.

The operation of valve 10 during refueling is illustrated in FIG. 1. In FIG. 1, the filler neck 42 is uncapped for refueling and so is exposed to atmospheric pressure. Any pressurized fuel vapor in filler neck 42 would normally be exhausted to the atmosphere through the open mouth of filler neck 42 instead of being conducted to the first side 28 of the diaphragm 26. Thus, inlet passageway 40 is also exposed to atmospheric pressure, as is vapor flow channel 38. Thus, as explained above, the first side 28 of diaphragm 26 is exposed to atmospheric pressure.

However, the second side 30 of diaphragm 26 is exposed to the pressure of the fuel vapor in the fuel tank 15 since pressurized fuel vapor is free to flow through inlet aperture 16 of conducting passageway 14 and then through branch passageway 18 to reach second side 30. When the pressure of fuel vapor in branch passageway 18 exceeds a predetermined level, the diaphragm 26 is moved in opposition to the closing forces of the spring 34 and the generally atmospheric pressure in vapor flow channel 38 away from its flow-blocking position toward a flow-delivery position, thereby allowing pressurized fuel vapor to escape from branch passageway 18 through outlet aperture 20 into interior region 12 as illustrated by the arrows in FIG. 1.

Once the pressurized fuel vapor enters interior region 12, it supplies a force against first side 46 of diaphragm 44 that is added to the closing force provided by spring 52. Pressurized fuel vapor from the fuel tank 15 flows through conducting passageway 14 to outlet aperture 22 to apply a force against a portion of second side 48 of diaphragm 44 defined by the area of outlet aperture 22. As shown, the area of first side 46 is proportionately larger than the area of that portion of side 48 exposed to aperture 22. Thus, while essentially the same fuel vapor pressure is supplied to both the first side 46 and the second side 48 of the diaphragm 44, the pressure acting against side 46 acts across a proportionately larger area than does the pressure acting across the portion of side 48. A proportionately greater force is thus exerted against side 46. Thus, diaphragm 44 remains in the flow-blocking position as shown.

Advantageously, when diaphragm 44 is maintained in the flow-blocking position, the pressurized fuel vapor is prevented from discharging through aperture 22 and thus accumulates in the fuel tank 15 to provide a fuel vapor barrier. The fuel vapor barrier occupies a given volume of the fuel tank 15 and thus limits the amount of liquid fuel which can be introduced into the fuel tank during refueling. Thus, valve 10 operates to assist in preventing overfilling of the fuel tank.

Operation of the valve 10 during operation of the vehicle is illustrated in FIG. 2. During vehicle operation the filler neck 42 is capped. Thus, pressurized fuel vapor in the fuel tank 15 can travel up the filler neck 42 to inlet passageway 40 and then to vapor flow channel 38 where it exerts a force against first side 28 of diaphragm 26. The cap is in place at all times other than refueling to permit pressurized fuel vapor to travel through vapor flow channel 38 to reach the first side 28 of diaphragm 26 without venting to the atmosphere through the mouth of the filler neck 12.

Second side 30 of diaphragm 26 is also exposed to pressurized fuel vapor for the fuel tank 15. Pressurized fuel vapor travels through branch passageway 18 to reach second side 30 of diaphragm 26. Of course, pressurized fuel vapor in branch passageway 18 can only act against that portion of side 30 lying within the area defined by aperture 20, while pressurized fuel vapor in vapor flow channel 38 acts across the entire area of side 28. Thus, despite the fact that diaphragm 26 is exposed substantially to equal fuel vapor pressures on both sides 28 and 30, the fuel vapor pressure acting across side 28 acts across a proportionately larger area than does the pressure acting across side 30 and is combined with the closing force of spring 34. It follows that a proportionately larger force is supplied to side 28, thus maintaining diaphragm 26 in a flow-blocking position blocking flow of fuel vapor through outlet aperture 20 of branch passageway 18 into interior region 12 as long as the fuel cap is in place on the filler neck 42.

Because fuel vapor is unable to flow to interior region 12, first side 46 of diaphragm 44 is exposed only to essentially atmospheric pressure. However, second side 48 of diaphragm 44 is exposed to pressurized fuel vapor flowing in conducting passageway 14. When the pressure of this fuel vapor reaches a predetermined level sufficient to overcome the biasing force of spring 52, diaphragm 44 will move to a flow-delivery position allowing flow of pressurized fuel vapor through outlet aperture 22 of conducting passageway 14 to exit passageway 24 and then to the fuel vapor treatment site. In this fashion, fuel vapors creating excessively high tank pressure can be vented either while the vehicle is stationary or running. Eventually tank pressure is reduced sufficiently that spring 52 moves diaphragm 44 back to its flow-blocking position.

Figure 3:
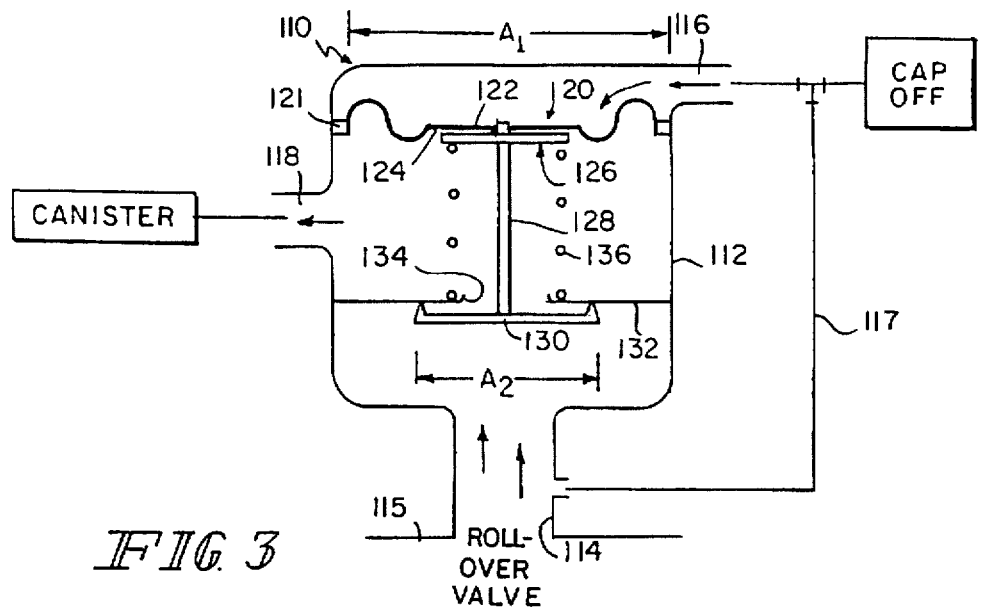
FIG. 3 is a schematic of another embodiment of a valve assembly in accordance with the present invention showing the blocking means in its flow-blocking position during refueling.
Figure 4:
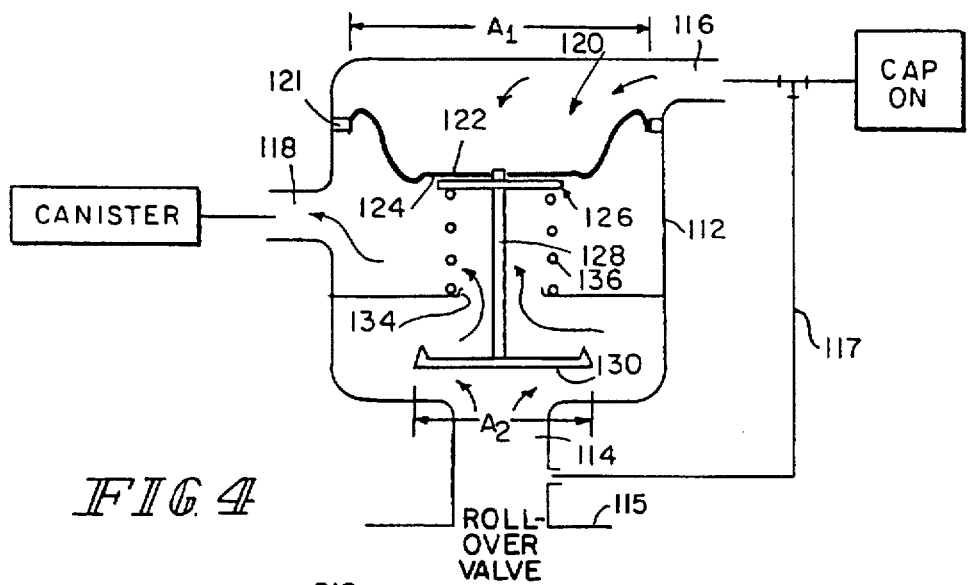
FIG. 4 is a schematic of the valve assembly of FIG. 3 showing blocking means in its flow-delivery position during vehicle operation.

Another embodiment of a tank pressure control valve in accordance with the present invention is provided in FIGS. 3-4. A tank pressure control valve 110 is shown to include a valve housing 112 connected to a fuel tank having a filler neck 117. Valve housing 112 can either be mounted directly to the fuel tank or can be connected to the fuel tank 15 by way of a conduit optionally containing a rollover valve assembly (not shown) therein. Valve housing 112 is formed to include a first vapor inlet passageway 114 open to communicate with the fuel tank 15. Valve housing 112 is also formed to include a second vapor inlet passageway 116 in communication with the filler neck 117 and a first vapor outlet passageway 118 in communication with a vapor treatment site. Vapor inlet passageway 116 can be opened to the atmosphere by removal of the fuel cap attached to filler neck 117 as shown in FIG. 4.

A flexible, annular diaphragm 120 is mounted within valve housing 112 by conventional mounting means 121. Diaphragm 120 has a top side 122 and a bottom side 124. An external spring (not shown) can be provided to bias the diaphragm 120 into its normal static position illustrated in FIG. 3. Alternatively, the diaphragm may be formed of an elastomeric material selected to normally retain the static position shown in FIG. 3 and to deform only under at least a predetermined pressure. Diaphragm 120 defines an area designated $A_1$ extending to the outer periphery of diaphragm 120.

A plate 126 is affixed to the underside 124 of diaphragm 120. Depending from the plate 126 is a rigid actuator stem 128. Mounted on actuator stem 128 for movement therewith is a valve member 130 defining an area designated $A_2$. Valve member 130 is movable between a flow-blocking position (shown in FIG. 3) and a flow-delivery position (shown in FIG. 4).

Valve housing 112 also includes a partition or platform 132 formed to include an aperture 134 providing a vapor outlet. Actuator stem 128 is positioned to extend through aperture 134. Partition 132 also provides a valve seat against which valve member 130 seats in its flow-blocking position as shown in FIG. 3. A spring 136 or other biasing means is positioned to act between partition 132 and plate 126. Advantageously, spring 136 normally biases valve member 130 to the flow-blocking position blocking flow of fuel vapor from fuel tank 15 to the canister through aperture 134.

Operation of the valve 110 during refueling is illustrated in FIG. 3. During refueling, it is desirable to prevent overfilling of the fuel tank 15 by providing a pressurized fuel vapor barrier within the fuel tank 15 which blocks the introduction of fuel in excess of a predetermined fuel capacity. Thus, during refueling, a tank pressure control valve should function to prevent the escape of vapor from the fuel tank 15 by blocking off the vapor outlets.

In valve 110, vapor inlet passageway 114 is exposed to vapor pressure from a buildup of vapor in the fuel tank 15 as fuel is added to the tank 15. Vapor pressure from the tank 15 applies a force across an area $A_2$ of valve member 130.

Second vapor inlet passageway 116 is exposed to essentially atmospheric pressure during refueling because second passageway 116 communicates with the filler neck 117, which is uncapped and thus exposed to the atmosphere during refueling. Atmospheric pressure acts across an area $A_1$ of diaphragm 120.

Thus, as fuel is added to the fuel tank 15 using a pump nozzle (not shown) inserted into the open filler neck 117, vapor pressure builds up to a predetermined level at which valve member 130 is biased into vapor-sealing engagement with platform 132. When valve member 130 is thus placed in the flow-blocking position, vapor is prevented from escaping through aperture 134, and will therefore remain in the fuel tank 15 to provide a pressurized vapor blanket as previously described.

Operation of the valve 110 during times other than during refueling is illustrated schematically in FIG. 4. While the vehicle is stationary or during operation of the vehicle, it is desirable to provide head valve means for venting fuel vapor to a fuel vapor treatment site such as a canister to relieve pressure in the fuel tank 15. Thus, the head valve means should be designed to open in response to pressure in excess of a predetermined pressure to allow escape of fuel vapor from fuel tank 15 through a vapor outlet.

As shown in FIG. 4, pressure relief is accomplished in valve 110 by the deformation of diaphragm 120 in opposition to spring 136 to move the valve member 130 away from its flow-blocking position to a flow-delivery position. Fuel vapor from the fuel tank 15 can vent through aperture 134 and then to a vapor treatment site or the like by way of passageway 118.

Advantageously, diaphragm 120 is designed to deform at pressures in excess of a predetermined pressure. During operation of the vehicle, top side 122 of diaphragm 120 is exposed to vapor pressure from the fuel tank 15 because passageway 116 communicates with the filler neck 117 and the filler neck 117 is capped during vehicle operation. Thus, vapor pressure from the tank applies a force across area $A_2$.

The underside 124 of diaphragm 120 is exposed to essentially atmospheric pressure since first outlet passageway 118 communicates with the atmosphere by way of the vapor treatment site. Thus, a pressure differential exists across diaphragm 120. However, diaphragm 120 is formed of sufficiently rigid material that it normally will not flex under a pressure differential of such relatively low magnitude. In addition, diaphragm 120 must overcome the biasing force of spring 136 in order to flex.

When vapor pressure builds up to a predetermined level, however, the pressure differential across diaphragm 120 increases to the point at which diaphragm 120 deforms in opposition to spring 136 to move valve member 130 away from its flow-blocking position. Advantageously, area $A_1$ is larger than area $A_2$. Thus, despite the fact that area $A_1$ and area $A_2$ are exposed to essentially the same pressure, the force acting on area $A_1$ is proportionately larger than the force acting on area $A_2$.

When valve member 130 has been moved to a flow-delivery position as illustrated in FIG. 4, fuel vapor can escape through aperture 134 to vent to passageway 118. Eventually, the pressure acting on area $A_1$ is reduced to below the predetermined level and the pressure differential is no longer sufficient to deform diaphragm 120. At this point, diaphragm 120 returns to the static position illustrated in FIG. 3 and spring 136 supplies a restoring force to move valve member 130 back to its flow-blocking position.

Figure 5:
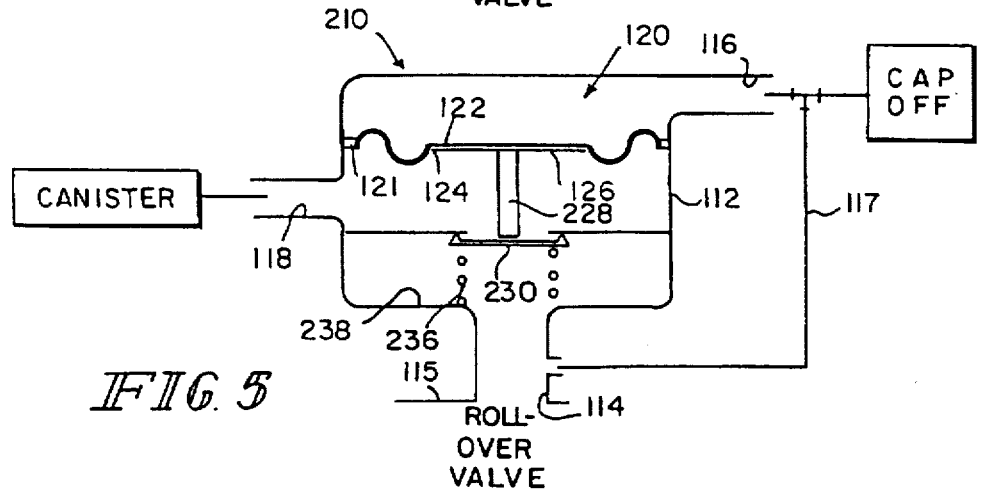
FIG. 5 is a schematic of yet another embodiment of the invention showing the blocking means in its flow-blocking position during refueling.

Yet another embodiment of a valve in accordance with the present invention is illustrated in FIG. 5. In FIG. 5, reference numbers identical to those in FIGS. 3–4 refer to features which perform the same or similar function. In FIG. 5, a valve 210 has actuator stem 228 which bears against a separate valve member 230 at least when the plate is moved to a flow-delivery position. It is not necessary that actuator stem 228 be rigidly connected to valve member 230; rather, stem 228 can be separate of valve member 230.

In valve 210, a spring 236 seats against an interior wall 238 of housing 112 and acts between interior wall 238 and valve member 230. Spring 236 biases valve member 230 toward its flow-blocking position as shown in FIG. 5.

Operation of the valve 210 during refueling and during vehicle operation proceeds analogously to operation of valve 110 in FIGS. 3 and 4.

Although the invention has been described in detail with reference to certain preferred embodiments, variations and modifications exist within the scope and spirit of the invention as described and defined in the following claims.

What is claimed is:

1. An apparatus for controlling discharge of fuel vapor from a fuel tank having a filler neck, the apparatus comprising a housing defining an interior region and being formed to include at least one vapor outlet, means extending within the interior region for conducting fuel vapor between the fuel tank and the interior region, the conducting means being formed to include an outlet aperture positioned to vent fuel vapor from the fuel tank to the interior region, means disposed within the conducting means for selectively blocking flow of fuel vapor through the conducting means, the blocking means being operable between a flow-blocking position and flow-delivery positions, means for yieldably biasing the blocking means toward the flow-blocking position, means for using pressurized fuel vapor from the filler neck to selectively move the blocking means in opposition to the biasing means away from the flow-blocking position toward a flow-delivery position so that fuel vapor discharges from the fuel tank through the conducting means into the interior region when the pressure of the fuel vapor in the filler neck rises above a predetermined level, the using means cooperating with the housing to define a vapor flow channel in communication with the filler neck, and means for rigidly interconnecting the blocking means and the using means, the interconnecting means extending through the outlet aperture.

2. An apparatus for controlling discharge of fuel vapor from a fuel tank having a filler neck, the apparatus comprising a housing defining an interior region and being formed to include at least one vapor outlet, the housing including an internal wall, means extending within the interior region for conducting fuel vapor between the fuel tank and the interior region, means disposed within the conducting means for selectively blocking flow of fuel vapor through the conducting means, the blocking means being operable between a flow-blocking position and flow-delivery positions, means for yieldably biasing the blocking means toward the flow-blocking position, the biasing means acting between the internal wall and the blocking means, and means for using pressurized fuel vapor from the filler neck to selectively move the blocking means in opposition to the biasing means away from the flow-blocking position toward a flow-delivery position so that fuel vapor discharges from the fuel tank through the conducting means into the interior region when the pressure of the fuel vapor in the filler neck rises above a predetermined level, the using means cooperating with the housing to define a vapor flow channel in communication with the filler neck.

3. An apparatus for controlling discharge of fuel vapor from a fuel tank having a filler neck the apparatus comprising a housing defining an interior region and being formed to include at least one vapor outlet, the housing including means for defining a platform, the platform being formed to include an outlet aperture positioned to vent fuel vapor from the fuel tank to the interior region, means extending within the interior region for conducting fuel vapor between the fuel tank and the interior region, means disposed within the conducting means for selectively blocking flow of fuel vapor through the conducting means, the blocking means being operable between a flow-blocking position and flow-delivery positions, means for yieldably biasing the blocking means toward the flow-blocking position, and means for using pressurized fuel vapor from the filler neck to selectively move the blocking means in opposition to the biasing means away from the flow-blocking position toward a flow-delivery position so that fuel vapor discharges from the fuel tank through the conducting means into the interior region when the pressure of the fuel vapor in the filler neck rises above a predetermined level, the using means cooperating with the housing to define a vapor flow channel in communication with the filler neck.

4. An apparatus for controlling discharge of fuel vapor from a fuel tank having a filler neck, the apparatus comprising a housing defining an interior region and being formed to include at least one vapor inlet and at least one vapor outlet and having a valve seat bordering the at least one vapor outlet, a valve member disposed within the housing and positioned to sealingly engage the valve seat to selectively block flow of vapor through the vapor outlet, the valve member being movable between a flow-blocking position and flow-delivery positions, means for yieldably biasing the valve member toward the flow-blocking position, a resilient member disposed within the housing and movable between a static position and displaced positions in response to exposure to fuel vapor pressure in excess of a predetermined level, the resilient member cooperating with the housing to define a vapor flow channel situated to receive a fuel vapor pressure input from the filler neck, and a drive member depending from the resilient member and bearing against the valve member at least when the valve member is positioned in a flow-delivery position so that the resilient member moves to a displaced position in response to a fuel vapor pressure input from the filler neck and causes the drive member to bear against the valve member to move the valve member from the flow-blocking position to a flow-delivery position allowing discharge of fuel vapor from the fuel tank through the vapor outlet.

5. The apparatus of claim 4, wherein the drive member is rigidly coupled to the valve member.

6. The apparatus of claim 4, wherein the drive member extends through the vapor outlet.

7. The apparatus of claim 4, wherein the resilient member comprises an annular diaphragm.

8. The apparatus of claim 7, further comprising a plate affixed to the diaphragm, the drive member being coupled to the plate.

9. The apparatus of claim 4, wherein the housing includes an internal wall and the biasing means acts between the internal wall and the valve member.

10. The apparatus of claim 4, wherein the housing includes a platform and the biasing means acts between the platform and the resilient member.

11. The apparatus of claim 10, wherein the platform is formed to include the at least one vapor outlet.

12. The apparatus of claim 4, wherein the valve member includes a plate.

13. The apparatus of claim 12, wherein the drive member is rigidly coupled to the plate.

14. The apparatus of claim 13, wherein the housing includes a platform formed to include the vapor outlet and the biasing means is disposed on the platform to act between the platform and the resilient member to bias the plate into the flow-blocking position in sealing engagement with the vapor outlet.

15. In a vehicle fuel system of the type which includes a fuel tank, a filler pipe having an inlet opening for admitting fuel to the tank, a cap for closing the outer end of the filler pipe inlet opening and a vapor trap for collecting fuel vapor vented from the tank, the fuel system further comprising:

a vent valve connected between the tank and the vapor trap and having an open condition and a closed condition; said vent valve including first means for placing said valve in an open, venting condition when the outer end of the filler pipe inlet opening is closed; and second means for placing said valve in a closed, non-venting position when the outer end of the filler pipe inlet opening is open.

16. Apparatus as defined in claim 15 wherein the vent valve comprises:

a valve body having a vapor inlet from the tank, a vapor outlet to the vapor trap, a valve seat between the inlet and outlet and a valve element biased toward and matable with said seat, said valve element being normally responsive to tank pressure to be displaced from said seat to provide vapor venting from the tank to the trap; and a control element connected to the valve element for maintaining the valve element on said seat when the filler pipe inlet is at atmospheric pressure.

17. Apparatus as defined in claim 15 further including a rollover valve connected between the tank and the vent valve.

18. Apparatus as defined in claim 15 wherein said first means includes a vapor vent line from said vent valve to the fuel tank; and said second means includes a vapor pressure line from said filler pipe to said vent valve.

19. A fuel system of the type including a fuel tank, a filler pipe for discharging fuel into the tank, a cap for closing the filler pipe inlet and a vapor trap for collecting fuel vapor vented from the fuel tank, the fuel system further comprising:

a rollover valve disposed between the fuel tank and the vapor trap; and a vent valve having a valve body, a vapor outlet to the vapor trap, and a vapor inlet from the rollover valve, a valve seat between the vapor inlet and the vapor outlet, a valve element matable with the valve seat, and a control element connected to the valve element for maintaining the valve element on the valve seat when the filler pipe inlet is at atmospheric pressure, and for displacing the valve element from the valve seat when the filler pipe inlet is at tank pressure.

20. A fuel system as in claim 19 wherein the control element is a diaphragm.

21. A fuel system as in claim 19 wherein the valve element is biased towards said seat by a spring.

22. A fuel system of the type including a fuel tank, a filler pipe for discharging fuel into the tank, a cap for closing the filler pipe inlet and a vapor trap for collecting fuel vapor vented from the fuel tank, the fuel system further comprising:

a rollover valve;

a vent valve;

means connecting the rollover valve and the vent valve in series between the tank and the vapor trap; and the vent valve having a valve body, a vapor outlet to the vapor trap, and a vapor inlet from the rollover valve, the valve seat between the vapor inlet and the vapor outlet, a valve element matable with the valve seat, and a control element connected to the valve element for maintaining the valve element on the valve seat when the filler pipe inlet is at atmospheric pressure, and for displacing the valve element from the valve seat when the filler pipe inlet is at tank pressure.

23. A fuel system as claimed in claim 22 wherein the valve element is biased toward said seat by a spring.

24. In a vehicle fuel system of the type which includes a fuel tank, a filler pipe for admitting fuel to the tank, a cap for closing the filler pipe inlet and a vapor trap for collecting fuel vapor vented from the tank;

a vent valve connected between the tank and the vapor trap and having an open condition and a closed condition;

said vent valve including first means for opening said vent valve when the filler pipe inlet is closed; and second means for closing said vent valve when the filler pipe inlet is open.

25. Apparatus as defined in claim 24, wherein the vent valve remains closed when the filler pipe inlet is open and fuel is being admitted to the fuel tank.

* * * * *